United States Patent
De Lange et al.

[15] 3,679,797
[45] July 25, 1972

[54] SINGLE-PHASE PESTICIDAL PREPARATIONS

[72] Inventors: Willem De Lange; Werner Duyfjes; Willem Maas, all of Amsterdam, Netherlands

[73] Assignee: U.S. Philips Corporation, New York, N.Y.

[22] Filed: Dec. 29, 1969

[21] Appl. No.: 888,918

[30] Foreign Application Priority Data

Nov. 4, 1969 Netherlands..........................6,917,222

[52] U.S. Cl..............................424/211, 424/213, 424/276, 424/278, 424/285, 424/300, 424/312, 424/320, 424/337, 424/352, 424/354, 424/358, 424/365, 71/DIG. 1
[51] Int. Cl. .......................................................A01n 17/08
[58] Field of Search..................424/211, 213, 276, 278, 285, 424/300, 312, 320, 337, 352, 354, 358, 365

[56] References Cited

OTHER PUBLICATIONS

Farm Chemical, (July 1967), p. 10.
C.A. (1) 49– 11942d (1955).
C.A. (2), 57– 14196a (1957).
C.A. (3) 54– 16734b (1960).

*Primary Examiner*—Stanley J. Friedman
*Attorney*—Frank R. Trifari

[57] ABSTRACT

A single-phase pesticidal U.L.V. preparation substantially consisting of a pesticide dissolved in isophorone, hexamethyl phosphoric acid triamide, dimethyl formamide or mixtures thereof, and a vegetable or animal wax or a hydrolysis product of the latter product as a phytotoxicity-reducing substance. The preparations are of low volatility, have a slight phytotoxicity and cause vary little leaf damage. The invention is of particular importance for U.L.V. preparations based on carbaryl, carbofuran, dimethoate, D.D.T., dieldrin, endrin, lindane, methoxychlor, tetrasul and tetradifon. The most suitable solvent is isophorone: the most suitable phytotoxicity reducing substance is wool fat alcohol or wool fat acid.

15 Claims, No Drawings

SINGLE-PHASE PESTICIDAL PREPARATIONS

In order to control noxious organisms, such as certain insects, fungi or weeds, in agriculture, horticulture or forestry the areas to be treated hitherto have generally been sprayed with aqueous solutions or dispersions of pesticides. The amounts of liquid to be used are widely different and may vary from 40 l to 1,000 l per ha. Especially if extensive areas have to be treated, such large amounts provide trouble. Hence, during the last few years liquid pesticidal preparations are being developed which can be used in very small amounts of from 0.5 l to about 5 l per ha. These preparations are sprayed as such either from ground machines or from aircraft. They are frequently referred to as U.L.V. preparations. The preparations used for this purpose generally contain the pesticide in a considerably higher concentration than is usual in controlling undesirable organisms with the much greater volumes of from 40 l to 1,000 l per ha of dilute pesticidal preparations dissolved or dispersed in water. Hence, in order to achieve maximum coverage of the areas to be treated, the U.V.L. preparations are preferably broken up into a mist of very small drops the major part of which has a diameter of about $100 \mu m$.

In some cases the pesticide itself is suitable to be used as a U.L.V. preparation, i.e., when the active substance is liquid and not, or slightly, volatile. Thus, malathion as such has been sprayed in amounts of 2 l or less per ha to control noxious insects in cotton cultures.

When the pesticide is a solid substance, its processing to form a U.L.V. preparation obviously requires a suitable solvent. Now this offers very special problems to those skilled in the art. Firstly, the pesticide must be readily soluble in the solvent because for U.L.V. use the highest possible concentration of the pesticide in the solvent is desirable. Further, the solvent must be slightly volatile, preferably less volatile than xylene, to prevent drying by evaporation of the drops formed during the formation of the mist, which may give rise to non-uniform distribution of the pesticidal preparation over the area to be treated. In addition, the solvent must be as little phytotoxic as possible. This requirement is also to be satisfied by other liquid formulations of pesticides, for example water-emulsifiable formulations, but this condition is even more stringent for U.L.V. preparations because the duration of the persistence of the sprayed drops on the leaf surfaces treated is comparatively long owing to the choice of little volatile solvents and hence the preparations are enabled to perform their phytotoxic action for a time longer than is the case when other preparations are used.

Finally it has been found that it is important for the solvent to have a low viscosity, for example less than 15 centipoise, and preferably even less than 5 centipoise. For with other spraying conditions remaining the same, the viscosity of the U.L.V. preparation determines the size of the sprayed droplets in a sense such that the droplets are greater in proportion as the viscosity is higher. Since in the case of U.L.V. spraying small droplets must be formed, the use of a low-viscosity solvent is desirable.

Applicant has succeeded in his efforts to find liquids which are highly suitable for use as slightly volatile good solvents of low viscosity for pesticides for the production of single-phase U.L.V. preparations which, it is true, have some phytotoxicity, but it has also been found that the phytotoxicity of these solvents can be greatly reduced by the addition of certain substances.

The invention relates to single-phase pesticidal U.L.V. preparations comprising a pesticide dissolved in isophorone, hexamethyl phsophoric acid triamide or dimethyl formamide or mixtures thereof, and furthermore as a phytotoxicity-reducing substance a vegetable or animal wax or a wax-like product obtained from the latter by hydrolysis or mixtures of these waxes or wax-like products.

The said three solvents have a small volatility compared to that of xylene. This was determined by evaporating, under reproducible circumstances, equal volumes of each liquid in open Petri dishes. For each liquid the time was determined in which 30 percent and 50 percent respectively (volume per cent) had evaporated. The evaporating times are given in the following Table I.

TABLE I

| | number of hours in which 30% of the liquid evaporates | number of hours in which 50% of the liquid evaporates |
|---|---|---|
| xylene | 0,5 | 1 |
| isophorone | 8 | 13 |
| hexamethyl phosphoric acid triamide | more than 48 | more than 48 |
| dimethyl formamide | 4 | 6.5 |

It should further be mentioned that the viscosity of isophorone and dimethyl formamide is about equal to 1 and that of hexamethyl phosphoric acid triamide lies between 2 and 3.

The said liquids are known by themselves and also as solvents. However, sofar they have not become known as solvents for pesticides for manufacturing single-phase U.L.V. preparations. But then it is not obvious to use these solvents for the production of U.L.V. preparations because it has been found empirically that these solvents by themselves are slightly phytotoxic. Hence it is a special feature of the invention that by adding a vegetable or animal wax or a hydrolysis product of an animal wax or a mixture of these substances the phytotoxicity of the said solvents can be reduced in a degree such that these solvents are suitable for practical use in U.L.V. preparations.

Another advantage of the invention consists in that henceforth it will be possible to produce high-concentrated solutions of certain pesticides of which hitherto, owing to their lower solubility in the usual solvents, only solutions of lower concentrations have been available.

The invention can generally be used for producing single-phase U.L.V. preparations of insecticides, acaricides, fungicides and herbicides. However, the invention is of particular importance for the production of insecticidal and acaricidal U.L.V. preparations.

It has been found that good results can be achieved with insecticides based on chlorinated hydrocarbons, such as D.D.T., endrin, endosulfan, dieldrin, telodrin, toxaphene, heptachlor, strobane, lindane: based on organophosphorus compounds, for example malathion, naled, parathion, dimethyl parathion, phenitrothion, dichlorvos, bromophos, azinphos-methyl, monocrotophos, metasystox, systox, disyston, trithion, E.P.N., diazinon, dimethoate, mevinphos, dipterex, ethion, phosphamidon, and further carbamates, such as carbaryl, dimetilan, α-naphthyl-N-dimethyl carbamate, carbofuran. In addition, good results according to the invention are obtained with the following acarides: tetradifon, tetrasul, kelthane, chlorparacide fenson, chlorfenson and binapacryl. The effect is also obtained with combinations of these substances, for example, with mixtures containing malathion and tetradifon or naled and tetrasul or carbaryl and tetradifon.

The usual commercial-grade qualities of the solvents to be used in accordance with the invention are suitable.

Animal or vegetable waxes or hydrolysis products of the animal waxes which are highly suitable within the scope of the invention are, inter alia, carnauba wax, candelilla wax, ouricury wax, esparto grass wax, flax wax, sugar cane wax, beeswax, chinese wax and wool grease or mixtures thereof. The constituents or the hydrolysis products of these substances in many cases have also proved to be highly suitable. This applies especially to wool grease with which in combination with wool fat alcohol and wool fat acid strikingly good results have been obtained.

The amount of vegetable of animal wax may vary from case to case, but in general an amount of from 0.5 to 5 percent by weight/volume of these substances, calculated with respect to the finished U.L.V. preparation, will be sufficient. If desired, a higher percentage of the vegetable or animal wax or of a hydrolysis product thereof may be used, for example a percentage of from 10 to 15 percent by weight/volume, but this generally requires the use of additional solvents, for example dodecyl benzene, because the solubility of the vegetable or animal waxes or of the hydrolysis products is not satisfactory in the solvents used in carrying out the invention.

The invention is eminently suitable, and is preferably used, for producing U.L.V. concentrates of carbaryl, endosulfan, carbofuran, methoxychlor, D.D.T., lindane, dimethoate, dieldrin, endrin, tetradifon and tetrasul.

Table II shows the percentages in which the pesticides mentioned in the preceding paragraph can be dissolved in the solvents according to the invention. The numbers, which express the numbers of grams of dissolved substance in 100 ml of the ultimate solution (percentage by weight/volume) have been determined by ascertaining the number of grams of the respective pesticide which is soluble in 100 ml of isophorone, hexamethyl phosphoric acid triamide or dimethyl formamide, and by measuring the specific weight and the ultimate volume of the saturated solution. The Table further gives the solubilities in xylene which were determined in a similar manner.

TABLE II

Solubilities in per cent by weight/volume.

| pesticidal substance | isophorone | hexamethyl phosphoric acid triamide | dimethyl formamide | xylene |
|---|---|---|---|---|
| | 20° C | 20° C | 20° C | 20° C |
| carbofuran | 4,5 | 36 | 20 | 1 |
| carbaryl | 15 | 50 | 45 | 9 |
| D.D.T. | 45 | 52 | 65 | 43 |
| dieldrin | 30 | 44 | 42 | 30 |
| dimethoate | 80 | 95 | 100 | 70 |
| endosulfan | 48 | 71.5 | 71 | 60 |
| endrin | 36 | 42 | 33 | 35 |
| lindane | 40 | 44 | 67 | 24 |
| methoxychlor | 50 | 61 | 71 | 42 |
| tetrasul | 38 | 44 | 16 | 32 |
| tetradifon | 12 | 32 | 36 | 12.5 |

Table II shows that isophorone, hexamethyl phosphoric acid triamide and dimethyl formamide in general are better solvents than xylene for the substances listed in the table.

If desired, the solvents according to the invention may be diluted with other solvents or be mixed with one another. This is of advantage in respect of hexamethyl phosphoric acid triamide, which is a comparatively expensive substance. This solvent and also dimethyl formamide can successfully be diluted with isophorone. When two solvents are used the mixing ratio (in parts by volume) preferably is from 1:9 to 9:1.

In virtue of the data of the above tables and the results obtained with the preparations according to the invention in practice, especially preparations of the following compositions have been found to be important. (The percentages are given in grams per 100 ml of the ultimate solution).

1. 15–40 percent of carbaryl dissolved in a mixture of isophorone and hexamethyl phosphoric acid triamide, in which 0.5 to 5 percent of a vegetable or animal wax or a hydrolysis product or a mixture thereof has also been dissolved. The preparation is suitable in a dosage of from 4 to 1.5 l per ha.

2. Fifteen to 30 percent of carbofuran dissolved in a mixture of hexamethyl phosphoric acid triamide and dimethyl formamide in which 0.5 to 5 percent of a vegetable or animal wax or a hydrolysis product or a mixture thereof has also been dissolved. The preparation is suitable for controlling insects in cotton cultures in a dosage of from 3 to 1.5 l per ha.

3. Twenty-five to 40 percent of D.D.T. dissolved in isophorone in which from 0.5 to 5 percent of a vegetable or animal wax or a hydrolysis product or a mixture thereof has also been dissolved. The preparation is suitable for controlling locusts and for controlling colorado beetles in potato cultures in a dosage of from 5 to 2 l per ha.

4. Fifteen to 25 percent of dieldrin or eldrin dissolved in isophorone in which from 0.5 to 5 percent of a vegetable or animal wax or a hydrolysis product or a mixture thereof has also been dissolved. The preparation is suitable for controlling insects, inter alia white fly, in cotton cultures in a dosage of from 5 to 1.5 l per ha.

5. Twenty-five to 60 percent of dimethoate dissolved in isophorone, which may be mixed with dimethyl formamide and in which from 0.5 to 5 percent of a vegetable or animal wax or a hydrolysis product or a mixture thereof has also been dissolved. The preparation is suitable for use in beats in amounts of from 1 to 0.5 l per ha for controlling mangold louse and mangold fly.

6. Twenty-five to 50 percent of endosulfan dissolved in isophorone in which from 0.5 to 5 percent of a vegetable or animal wax or a hydrolysis product or a mixture thereof has also been dissolved. The preparation is suitable for use in cotton cultures in amounts of from 3 to 1.5 l per ha.

7. Thirty-five to 50 percent of lindane dissolved in a mixture of isophorone and dimethyl formamide, in which from 0.5 to 5 percent of vegetable or animal wax or a hydrolysis product or a mixture thereof has also been dissolved. The preparation is suitable for controlling insects in cotton cultures in amounts of from 4.5 to 3.5 l per ha.

8. Thirty-five to 55 percent of methoxychlor dissolved in isophorone, which may be mixed with dimethyl formamide, and in which from 0.5 to 5 percent of a vegetable or animal wax or a hydrolysis product or a mixture thereof has also been dissolved. The preparation is suitable for controlling insects in swampy areas in amounts of from 5 to 4 l per ha.

9. Twenty to 30 percent of tetrasul dissolved in isophorone in which from 0.5 to 5 percent of a vegetable or animal wax or a hydrolysis product or a mixture thereof has also been dissolved. The preparation is suitable for controlling red spider mites in cotton in amounts of from 2.5 to 1 l per ha.

10. Ten to 15 percent of tetradifon dissolved in isoforone, which may be mixed with dimethyl formamide and in which from 0.5 to 5 percent of a vegetable or animal wax or a hydrolysis product or a mixture thereof has also been dissolved. The preparation is suitable for controlling red spider mites in cotton in amounts of from 4 to 2 l per ha.

11. Fifteen to 25 percent of carbaryl and 4 to 6 percent of tetradifon dissolved in a mixture of isophorone and hexamethyl phosphoric acid triamide, in which 0.5 to 5 percent of a vegetable or animal wax or a hydrolysis product or a mixture thereof has also been dissolved. The preparation is suitable for controlling insects and red spider mites in cotton cultures in amounts of from 4 to 2.5 l per ha.

12. Five to 8 percent of tetradifon and 25 to 40 percent of malathion dissolved in isophorone, in which from 0.5 to 5 percent of a vegetable or animal wax or a hydrolysis product or a mixture thereof has also been dissolved. The preparation is suitable for controlling red spider mites and insects in cotton cultures in amounts of from 5 to 3 l per ha.

Particularly good results were achieved when in the aforesaid preparations 1–12 wool fat alcohol or wool fat acid was used as a phytotoxicity-reducing substance.

After the application of the preparations, no, or substantially no, damage of the plants treated and a strong reduction of the noxious insects or red spider mites to be controlled were found.

The U.L.V. preparations according to the invention can be sprayed on the plants from the ground or from the air. An example of a suitable spray nozzle is that of the type S.S.80015 which is preferably operated at a pressure of 3.2 kg/cm$^2$ (equivalent to 45 l b/sq. inch). When the preparation is sprayed from an aircraft, suitably the flying height is from 2 to 3 m and the flying speed 160 km/hour.

Table III gives compositions of preparations according to the invention and their phytotoxicities. As a rule, this phytotoxicity is determined with a large excess dosage varying from 20 to 40 l per ha. The phytotoxicity is expressed by the numbers 0 to 5, where 0 means: no damage, and 5 means: maximum damage. The table further includes data about the phytotoxicity of the corresponding preparations which contain no vegetable or animal wax or hydrolysis product thereof, and further about the phytotoxicity of the solvents isophorone, hexamethyl phosphoric acid triamide and dimethyl formamide, both in the presence and in the absence of the said phytotoxicity-reducing substances.

What is claimed is:

1. A single-phase pesticidal preparation consisting of a pesticide, in a pesticidally effective amount, dissolved in at least one solvent selected from the group consisting of isophorone, hexamethyl phosphoric acid triamide and dimethyl formamide and from 0.5 to 5 percent of a phytotoxicity reducing substance, said phytotoxicity reducing substance being at least one wax or wax-like product selected from the group consisting of carnauba wax, candelilla wax, esparto grass wax, flax wax, sugar cane wax, beeswax, chinese wax, ouricury wax, wool grease, wool fat alcohol and wool fat acid.

2. The pesticidal preparation of claim 1 wherein the pesticide is 15 to 40 percent of carbaryl dissolved in a mixture of isophorone and hexamethyl phosphoric acid triamide.

3. The pesticidal preparation of claim 1 wherein the pesticide is 15 to 30 percent of carbofuran dissolved in a mixture of hexamethyl phosphoric acid triamide and dimethyl formamide.

4. The pesticidal preparation of claim 1 wherein the pesticide is 25 to 40 percent of D.D.T. dissolved in isophorone.

5. The pesticidal preparation of claim 1 wherein the pesticide is 15 to 20 percent of dieldrin or endrin dissolved in isophorone.

6. The pesticidal preparation of claim 1 wherein the pesticide is 25 to 60 percent of dimethoate dissolved in at least one solvent selected from the group consisting of isophorone and dimethyl formamide.

7. The pesticidal preparation of claim 1 wherein the pesticide is 25 to 50 percent of endosulfon dissolved in isophorone.

8. The pesticidal preparation of claim 1 wherein the pesticide is 35 to 50 percent of lindane dissolved in a mixture of isophorone and dimethyl formamide.

9. The pesticidal preparation of claim 1 wherein the pesticide is 35 to 55 percent of methoxychlor dissolved in isophorone.

10. The pesticidal preparation of claim 1 wherein the pesticide is 20 to 30 percent of tetrasul dissolved in isophorone.

11. The pesticidal preparation of claim 1 wherein the pesticide is 10 to 30 percent of tetradifon dissolved in at least one solvent selected from the group consisting of isophorone and dimethyl formamide.

12. The pesticidal preparation of claim 1 wherein the pesticide is a mixture of 15 to 25 percent of carbaryl and 4 to 6 percent of tetradifon dissolved in a mixture of isophorone and hexamethyl phosphoric acid triamide.

13. The pesticidal preparation of claim 1 wherein the pesticide is a mixture of 5 to 18 percent of tetradifon and 25 to 40 percent of malathion dissolved in isophorone.

14. The pesticidal preparation of claim 1 wherein the phytotoxicity reducing substance is selected from the group consisting of wool grease, wool fat alcohol and wool fat acid.

15. The method of combatting noxious organisms such as insects or fungi in agriculture, horticulture or forestry characterized in that a pesticidal composition of claim 1 is atomized in an amount of 0.5–5 l per hectare over the area where the noxious organisms occur.

* * * * *

PO-1050
(5/69)

UNITED STATES PATENT OFFICE
CERTIFICATE OF CORRECTION

Patent No. 3,679,797   (PHN 3765) Dated   July 25, 1972

Inventor(s)   WILLEM DE LANGE ET AL

It is certified that error appears in the above-identified patent and that said Letters Patent are hereby corrected as shown below:

In the title page, item [30], before "Nov. 4, 1969 Netherlands..........6,917,222" the following insertion should be made -- Dec.25, 1968 Netherlands 6,818,692  June 7, 1969 Netherlands 6,908,716 --.

Signed and sealed this 29th day of May 1973.

(SEAL)
Attest:

EDWARD M.FLETCHER,JR.
Attesting Officer

ROBERT GOTTSCHALK
Commissioner of Patents